Sept. 10, 1963 — J. E. ADAMS — 3,103,141
STOP COMBINATION CONTROL SYSTEM FOR ORGANS
Filed May 19, 1960 — 2 Sheets-Sheet 1

INVENTOR.
JOHN E. ADAMS
ATTORNEYS

Sept. 10, 1963  J. E. ADAMS  3,103,141
STOP COMBINATION CONTROL SYSTEM FOR ORGANS
Filed May 19, 1960  2 Sheets-Sheet 2
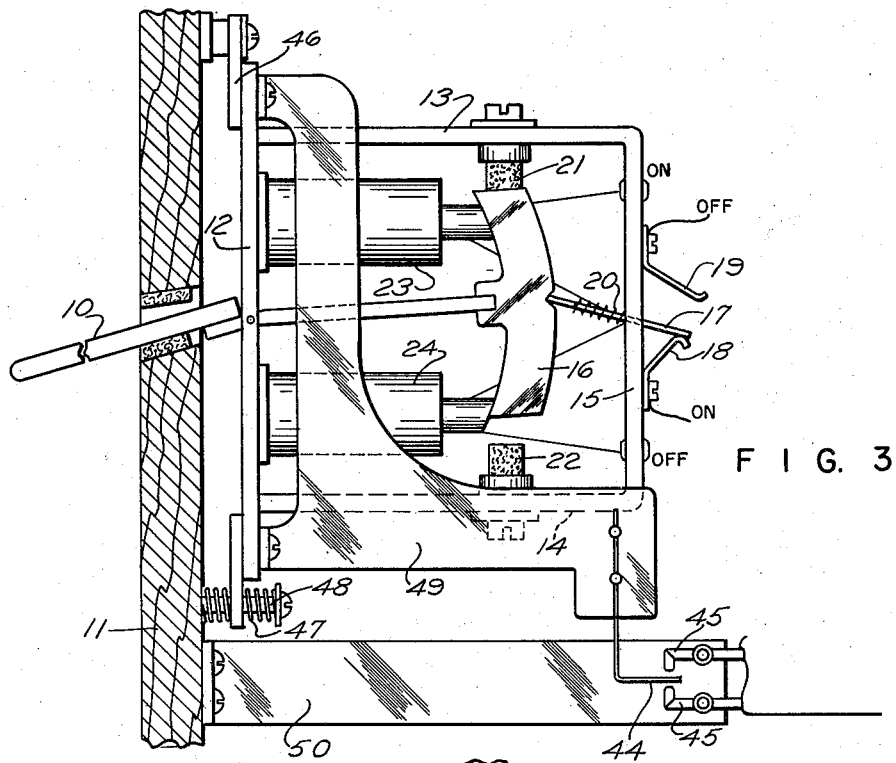
FIG. 3
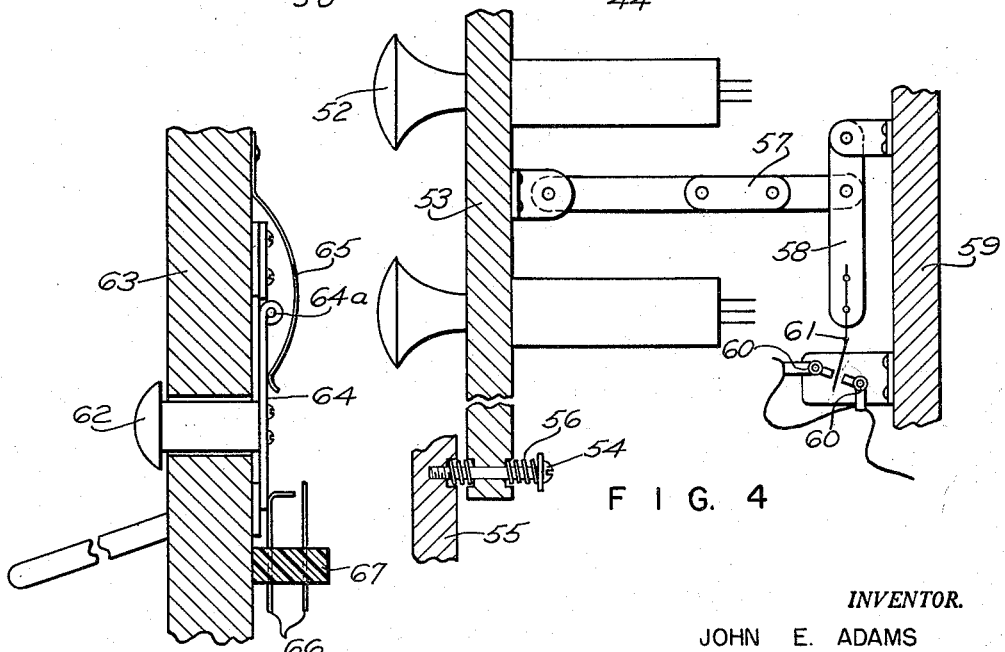
FIG. 4
FIG. 5
INVENTOR.
JOHN E. ADAMS
BY Emery, Booth, Townsend
Miller, + Weidner
ATTORNEYS United States Patent Office 3,103,141
Patented Sept. 10, 1963

3,103,141
STOP COMBINATION CONTROL SYSTEM
FOR ORGANS
John E. Adams, 76 Center St., Burlington, Mass.
Filed May 19, 1960, Ser. No. 30,289
3 Claims. (Cl. 84—343)

This invention relates to stop combination actions for organs and provides more particularly an improved system and apparatus for selecting and altering the combinations of stop keys which are desired to be brought on while playing the organ.

In order to achieve the desired tonal effects, and also to permit the operator to vary those effects as the performance proceeds, the organ pipes are arranged in groups or ranks which are sounded or voiced by stops, which stops are controlled in turn by keys (or they may be tablets or knobs) mounted at the console for manipulation by hand or foot of the organist. The stop keys have "on" and "off" positions between which they may be shifted individually, to sound or silence the stops controlled thereby. Or the keys may be controlled or shifted collectively or in groups, and to bring on different desired stop combinations, by means of the stop combination actions.

The stop combination actions or control systems provide pluralities of batteries of what may be called memory units in which different stop combinations may be stored, and associated with each said battery a control by the actuation of which that battery may be connected for either reciting or learning stop positions, as selected by manipulation of system control means.

The prior or conventional systems of stop combination action include what are called the capture and tripper systems.

The capture system allows for the setting up or storing of a particular stop combination in a particular battery of memory units by provision of a special capture button which it is necessary to actuate or press first for conditioning the system and particularly the memory units for learning as opposed to reciting, before actuating or pressing also the control or piston button associated with the particular memory unit battery, to bring the memory units of that battery into input connection with and so as to learn the "on" or "off" positions of the stop keys in the pattern or combination in which they have been set up.

The tripper system employs similarly a plurality of batteries of memory units, but requires that for setting up a desired stop combination in a particular memory battery the piston button associated with that battery be pressed and held while the stop keys are then pressed one by one to trip or position correspondingly the correlated memory units and so to impress on the memory battery the desired stop combination.

The invention provides a novel stop combination action or control system combining the advantages and omitting the disadvantages of the prior capture and tripper systems, and by which the control arrangement or set-up may be shifted from reciting to learning more simply and easily than heretofore, and whereby the converting of the system for both setting up and modifying a stop combination may be accomplished by a manipulation of or in the region of the stop keys.

The invention will be better understood from a consideration of the following specification, taken in conjunction with the accompanying drawings in which:

FIG. 3 shows an exemplary form of a stop key with the capture contacts and mounting of the invention;

FIG. 4 shows similarly an alternative or draw knob form of the stop control; and FIG. 5 shows an alternative form of the capture contact operating means.

Figures 1, 2:
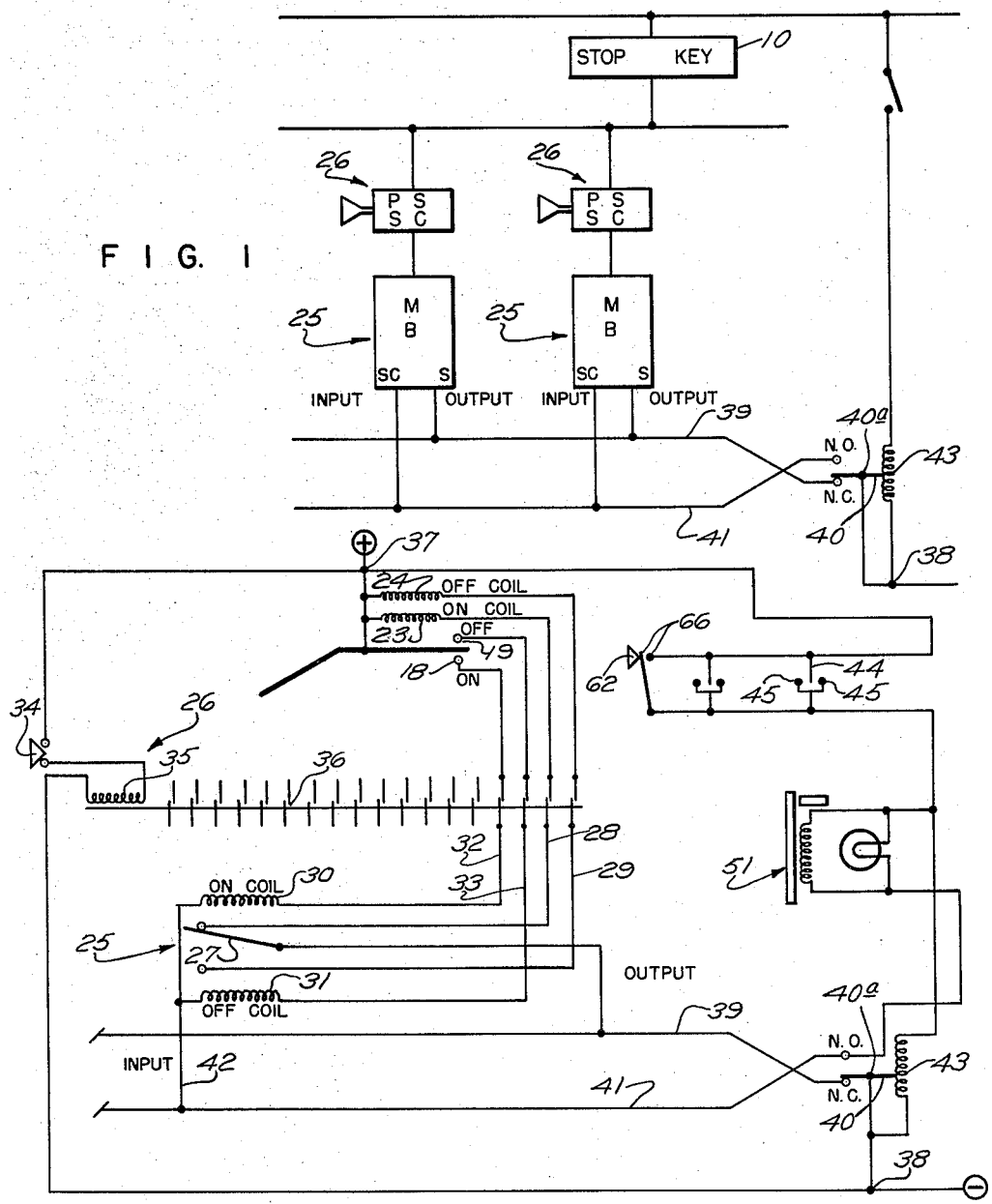
FIG. 1 is a fragmentary schematic view of the control system of the invention.
FIG. 2 is a more detailed circuit drawing.

In an organ such as here concerned the stops are controlled by keys (or tablets or knobs) which are ranged along the jamb or name board of the console and which are individually switchable between "on" and "off" positions, as by up and down pivoting, or in and out reciprocating. I show in FIG. 3 an exemplary such stop key assembly comprising an arm 10 projecting outwardly through the jamb or name board 11 and pivoted behind it for reciprocating vertically between "on" and "off" positions in which the frontal portion of the arm is depressed and raised respectively. The stop key arm or lever 10 is seen more particularly as pivoted through the forward wall 12 of a frame or cage having top and bottom walls 13 and 14, and also a back wall 15.

The stop key arm 10 mounts at its rear terminus a double ended or yoke-like cross piece 16 to which is pivotally attached a contact wire or strip 17 which is rocked or pivoted through rear wall 15 between "on" and "off" contacts 18 and 19, the said contacts having the circuit connections as hereinafter described. An extra or second "on" contact is of course provided for wiring directly to the stop to be controlled by the particular key.

Positive control action of the switch 17 responsive to a relatively moderate finger pressure on the key arm 10 is assured by compression about said switch of a spring 20 acting between the back wall 15 and the cross piece 16 to drive the arm 10 in either direction of its up and down movement. Said up and down movement of the stop key 10 is limited by felt or the like stops 21, 22 mounted on and projecting inwardly from the frame top and bottom 13, 14 respectively.

Vertically arranged and supported at the frame forward wall 12 are stop key positioning devices herein embodied as the solenoids 23, 24 whose magnets or coils may be energized as hereafter explained to pull the stop key 10 and more particularly its cross piece 16 oppositely to the uppermost or "on" and lowermost or "off" positions wherein the said cross piece 16 is seated against the stops 21 and 22 respectively.

Referring now to FIG. 1 each stop key assembly as just described is there shown to have parallel connection to a plurality of stop key position controlling means comprising each a memory battery 25 and a control 26 therefor. Each said memory battery 25 consists of one or more memory units which are connected by the associated control 26 to as many stop keys. Thus the different memory batteries may vary in respect to the number or selection of as well as in the on-off arrangement of the key assemblies making up the stop patterns which are preserved or stored in the batteries for reproduction at the command of the organist.

The stop combination control of this invention affects the input and output connection of the memory batteries in alternative learning and reciting set-ups or arrangements of the control system or circuit in which they are comprised. In the learning set-up the units of a memory battery 25 are coupled or connected by actuation of the associated control element or switch 26 for receiving and storing on-off position indications from the correlated stop keys. In the reciting arrangement or set-up of the control circuit the memory units 25 are brought into output connection with, and for transmitting the learned or stored position indications as control signals to, the aforementioned positioning devices, which latter act in turn to order the correlated stop key assemblies to the corresponding "on" or "off" positions.

In the electro-mechanical form herein shown, and referring particularly to FIG. 2, the memory units comprise each a switch 27 shiftable oppositely between contact terminals of and for connection alternatively through parallel on-off lines 28, 29 to the on-off positioning coils 23, 24 of the stop key with which that switch 27 is correlated. A pair of switch control solenoids or on-off coils 30, 31 are arranged at opposite sides of the switch 27 and for controlling or shifting it to one or the other of its "on" or "off" representing and storing positions. In the learning arrangement of the control system the switch controls 30, 31 have input connection through the parallel lines 32, 33 to the hereinbefore mentioned "on" and "off" position indicating or representing means or contacts 18, 19, FIG. 2.

The control means 26 associated with each memory battery unit may as here comprise a piston button 34 the closing or pressing of which completes a circuit through a solenoid 35 which is thereby energized to drive or close a normally open gang switch 36 constructed and arranged simultaneously to break and make as to each memory unit connections intermediate in all four lines 28—29, 32—33. Thus the actuation of the piston button 34 serves to bring on or connect both the input or stop key position pickup lines 32, 33 and the output or positioning device controlling lines 28, 29 except as one of those learning and reciting line pairs is alternatively or selectively disabled by the further system control means hereinafter to be described.

The switch 36 may take any convenient form, for example, as in FIG. 2 where one or the other of the sets of contacts at which the action of the switch is to make or break the intermediate connection is formed as resilient fingers or the like overlapping the other set of contacts, and the switch comprises an insulated bar or strip shifted by solenoid 35 against the resilient finger set so as to urge them conjointly or simultaneously into conductive contact with the opposing set of contacts.

A battery or other suitable source of current may be coupled into the circuit in any convenient manner as herein at the positive and negative pole points 37 and 38 to which the other circuit elements may be connected as shown in FIG. 2.

With the control system as thus far described and in the reciting set-up shown in FIG. 2 the actuation as described of any memory control 26 will complete a circuit from the positive side 37 through one or the other of the positioning device coils 23, 24 of each stop key assembly which is connected by, and through one or the other of the output lines 28, 29 to the switches 27 of each unit of the memory battery 25 which is associated with, that control 26.

For convenience the several memory battery switches 27 may have parallel take-off from a common supply line 39, FIGS. 1 and 2, through which they connect to the negative side 38.

From the description thus far given those skilled in the art will appreciate that in the reciting arrangement of the system, and in actuating a particular desired memory battery control 26, as by pressing a piston button, the organist brings on a particular desired stop combination by establishing output communication of the memory battery units with the positioning devices for the correlated stop keys. In this, more particularly, each included memory unit 25 signals or energizes its positioning devices 23, 24 to control or order a stop key assembly 10 to the position corresponding to that occupied by the unit switch 27, the latter representing the stop key "on" or "off" indication set up and stored in the memory.

Novel system control means are provided by this invention for easy, sure converting of the action from reciting to learning. Referring to FIG. 2, a normally closed switch 40 is mounted in the supply line 39, so as to connect negative pole 38 through its normally open side to a common setting line 41 having parallel take-offs 42 to which are parallel-connected the switch control or setter solenoid means 30, 31 of each memory unit. The switch 40 is controlled and shifted about pivot 40a between its indicated normally closed and open positions by a capture relay 43 connected as convenient between the positive and negative sides 37, 38, and in a circuit comprising also one or more make-break assemblies herein shown as switches 44 centered between parallel capture contacts 45. It will be seen that shifting of the switches 44 in either direction from the open position shown and so as to engage one or the other contact 45 will close or complete the circuit and so energize solenoid 43. The latter is arranged by its said energizing to drive switch 40 from the indicated normally closed position, in which the memory units have output or reciting connection through supply line 39, to the opposite normally open position, in which the output connections are broken and the memory units have input or learning connection through setting line 41.

In accordance with the invention the switches 44 are mounted for said shifting, and so for converting the system from reciting to learning, by extra-pressure manipulation of the stop keys. This may be accomplished as herein by mounting one or more or all of the stop key frames for vertical pivoting behind the console, as by hanging or supporting the frame front faces 12 from or through a flexible element or strip 46, and for lateral or front and rear shifting of the frame as controlled or opposed by a centering spring 47 which may as herein be carried by a pin 48 mounted on the console for projection freely through the frame front 12 (or an extension thereof). Centering spring 47 yieldably engages plate 12 from both sides with a force to still the stop key frame as against normal manipulation of the arm 10, which thereby serves only to reposition switch 17 for engagement with one or the other of contacts 18, 19. But by pushing the stop key 10 in either its existing or the opposite up-down direction and with a force or extra-pressure to overcome spring 47 the stop key manipulation is made to shift also the switch 44 as described into engagement with one or the other contact 45.

For shifting with and by the frame subject to the described extra-pressure manipulation of the stop key, the switches 44 are conveniently and herein mounted on booms 49, which latter may be rigid or integral with the stop key frames, as clearly shown in FIG. 3. The opposing contacts 45 may be given fixed support from a post 50 anchored to the rear of console jamb 11.

From the foregoing it will be appreciated that under this invention the converting of the control system from reciting to learning may be accomplished by extra-pressure manipulation of any stop key mounted and fitted as just described, and either in its existing direction or position as in capturing or in its opposite direction and position as in tripping. Again the required extra thrust or push of the key arm 10 has been shown to cause the engagement of switch 44 with one contact 45 and thereby to energize relay 43 to shift switch 40 to connect the setting line 41 while disconnecting supply line 39. In the converting of the system from reciting to learning, then, the output lines 28, 29 are disabled to prevent the actuation of the positioning devices, and the input lines 32, 33 are enabled to cause the energizing of the switch control means 30, 31 upon the actuation also of the associated control such as the piston button 34.

It will be appreciated that the learning or capturing of a desired stop combination may also be accomplished if preferred by pressing the piston button first, or before effecting the capture manipulation of a stop key. In either case and as to each memory unit there will be energized one of the solenoids 30, 31 to order the unit switch 27 to a position representing the position which the stop key for that unit occupies in the desired stop combination.

The capture line may also include an action indicator comprising a visible or audible signal means such as schematically shown at 51 and which may be connected through the switch 40 so as to show or signal only its actual shifting by the energizing of solenoid 43.

From the foregoing it will be appreciated that under this invention the player or performer finds control of the apparatus at the place where instinct sends him, for constructive or corrective action. Assume for example that for any reason a change is desired in the pattern or combination of stops responding to a particular stop combination control. To effect such a change with a conventional capture system would require pressing the stop keys to set the new combination desired and then pressing both the capture and piston buttons to capture the combination. But with the control system of this invention the operator need only extra-pressure-manipulate the offending or to-be-altered stop keys themselves directly to accomplish the desired revision. And there is no risk of destroying the combination which exists on the button through wrong manipulation.

In setting up also, with the control system of this invention, the operator can record very simply and directly the desired combination. As hereinbefore explained, this merely requires arranging the system for learning by actuation through or at one of the stop keys, and then actuating the stop combination control or piston button. Thus again it is seen that by this invention there are combined the advantages of both the capture and the tripper types of prior stop combination control systems.

In FIG. 4 I show the invention as employed with the draw knob type of stop control, and wherein the knobs 52 are supported through a plate or panel 53, hinged or pivoted for lateral or forward-rearward shifting relatively to a pin 54 carried by the jamb or other fixed element of the console, the shifting inhibited by a centering spring 56. An extra-pressure push or pull on the knob 52 will rock the plate 53 and translate with it link 57. The link 57 pivots in turn the lever 58 which is pivotally supported from plate 59 to which are bracketed also the capture contacts 60. A capture switch 61 carried by lever 58 and normally centered between the contacts 60 is thus actuated to engage said contacts by the described extra-pressure manipulation of any draw knob 52 to which it may be coupled in the manner shown. The contacts 60 and switch 61 will be understood to have the same circuit connections as the contacts 45 and switch 44 hereinbefore described.

The arranging or altering of the control system may be variously accomplished, under the invention, from or at the stop keys. In the alternative embodiment of FIG. 5 the system converting means comprises a bar 62 mounted at the console 63 and which may be arranged and of a length to be engageable by the same hand as and while manipulating also one or several or any of the stop keys. The bar 62 has one or more projections freely shiftable through the console 63 and supported at the back by a strap or the like 64 which may be hinged as at 64a and biased to the front as by a spring 65. Strap 64 engages also one of a pair of contacts 66 mounted for normal spacing in a block 67 and such that rearward shifting of the strap forces the contacts into engagement. Thus the contacts 66 define a normally open switch which is closed by pressure on bar 62, FIG. 5 to complete the circuit similarly as does any of the switches 44, 45, energizing coil 43 and thereby converting the system as hereinbefore described.

Those skilled in the art will appreciate that the control system hereof may be embodied in still other mechanical, electrical, and pneumatic forms within the scope and spirit of the invention. Thus, my invention is not limited to the particular embodiments thereof illustrated and described herein, and I set forth its scope in my following claims:

I claim:

1. In an organ having a plurality of stops and stop keys, a stop combination control system comprising on-off positioning devices for said stop keys, a plurality of stop combination controls, a battery of one or more memory units associated with each said control and actuated thereby to recite a preset on-off combination to said positioning devices, and means operable by manipulation of any of said stop keys for converting the system from reciting to learning, whereby upon actuation of a control to capture the settings of said stop keys on the associated battery of memory units.

2. In an organ having a plurality of stops and stop keys, a stop combination control system comprising on-off positioning devices for the stop keys, a plurality of stop combination controls, a battery of memory units for each control and adapted upon input connection to learn and upon output connection to recite on-off positions for said stop keys, said memory units in the reciting arrangement of said system brought by actuation of said controls into output connection with said positioning devices, and means operable to convert said system to a learning arrangement in which said control actuation brings said memory units into input connection with said stop keys, said converting means acting responsive to the capture manipulation of any said key in the existing position to set up any said battery of memory units in, and responsive to its tripper manipulation to the opposite position to modify any said battery of memory units to, the on-off positions desired for the stop combination to be brought on by actuation of the associated control.

3. In an organ having a plurality of stops and stop keys, a stop combination control system comprising positioning devices for said stop keys, a plurality of stop combination controls, a battery of memory units associated with each said control, each said memory unit adapted to receive, store and transmit a stop key position indication and connected by actuation of the associated control for storage reception from a stop key and for control transmission to a positioning device, and system control means including a switch operable by extra-pressure manipulation of a stop key in either direction for selecting as between said receiving and transmitting connection of said memory units.

References Cited in the file of this patent

UNITED STATES PATENTS

| | | |
|---|---|---|
| 1,716,651 | Moorhouse | June 11, 1929 |
| 2,104,338 | Wick | Jan. 4, 1938 |
| 2,127,266 | Moorhouse | Aug. 16, 1938 |
| 2,699,085 | Zuck | Jan. 11, 1955 |
| 2,954,716 | Raymond | Oct. 4, 1960 |

FOREIGN PATENTS

| | | |
|---|---|---|
| 364,332 | Great Britain | Jan. 7, 1932 |